United States Patent Office 3,817,787
Patented June 18, 1974

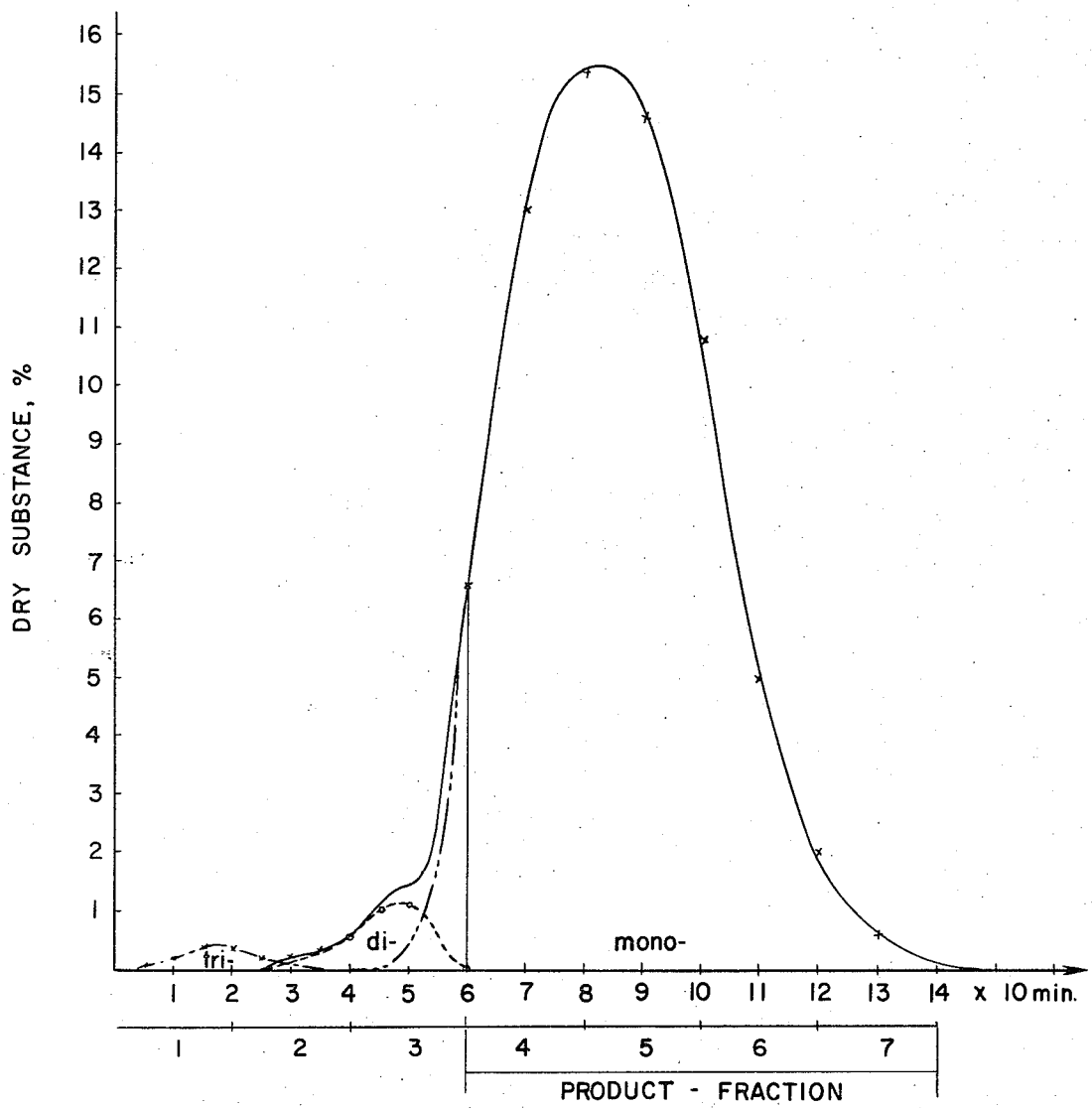
SEPARATION OF SACCHARIDE MIXTURES

3,817,787
METHOD FOR SEPARATING MONOSACCHARIDES FROM MIXTURES INCLUDING DI-, AND HIGHER SACCHARIDES
Ernst Gustav von Hertzen and Carl E. F. Aminoff, Helsinki, Finland, assignors to Suomen Sokeri Osakeyhtio (Finnish Sugar Company), Helsinki, Finland
Filed Jan. 26, 1972, Ser. No. 220,886
Int. Cl. C13d 3/14
U.S. Cl. 127—46 B                        15 Claims

ABSTRACT OF THE DISCLOSURE

Monosaccharides are separated from saccharide mixtures including di-, tri-, and oligosaccharides by a process which includes the step of ion exclusion utilizing alkali metal and alkaline earth metal salts of polystyrene sulfonate cation exchange resins cross-coupled with di-vinyl benzene using a column height of from about 2.5 to about 5 meters.

---

The present invention relates to a process for separating monosaccharides from mixtures comprising monosaccharides, disaccharides, trisaccharides and oligosaccharides. More specifically, the invention is concerned with methods for purifying mixtures of glucose and fructose, which are known as starch conversion syrups.

Starch conversion syrups are produced by hydrolysis of starch with mineral acids under pressure, by acid and single enzyme conversions and by acid and dual enzyme conversions. It is desirable to improve the characteristics of the starch syrups by increasing their content of fructose to make them more sweet.

Methods of isomerizing high glucose starch conversion syrups to increase the fructose content thereof are well known in the art. One type of such process is disclosed in the Scallet et al. U.S. Pat. No. 3,305,395. In accordance with one aspect of the Scallet et al. invention, the isomerized syrup, after preparation, is passed through an ion exchange or ion exclusion step which purifies the syrup by removing impure degradation products of ionic form including colored products and inorganic ions. It is also known to separate dextran from fructose using ion exchange resins and one such method is disclosed in the Sargant U.S. Pat. No. 3,184,334.

Starch conversion syrups of various types and grades are useful commercially. For certain purposes, the presence of disaccharides and higher sugars therein is undesirable, because they cause problems in end use. In addition, the disaccharides and higher sugars interfere with processes for separating fructose from glucose.

It has now been found that monosaccharides in nearly pure condition may be recovered from mixtures comprising the monosaccharide together with disaccharides, trisaccharides and oligosaccharides by providing a column of a polystyrene sulfonate cation exchange resin cross-coupled with from 2 to 8 weight percent of di-vinyl benzene, the resin being in either the alkali metal or alkaline earth metal salt form. The column of resin is submerged in water and an aqueous solution comprising the mixture of mono-, di-, tri- and oligosaccharides is provided in uniform supply onto the resin surface of the resin column. The aqueous solution has a dry material content of from 20 to 60% by weight and is supplied at a flow rate of from 0.2 to 4.0 cubic meters per hour per square meter of the cross-section of the resin column.

After a suitable amount of feed solution has been supplied to the column, a quantity of water is introduced in uniform supply to the resin surface in the column and the compounds of the feed solution are eluted at different rates depending upon their affinity for the resin. The first materials to be recovered are the tri-, and higher saccharides. The next fraction contains disaccharides together with a small proportion of the monosaccharides. The last and major fraction is substantially pure and comprises the major portion of monosaccharides.

In one preferred embodiment of the invention, a sodium salt of the resin is used and a fairly rapid separation of the respective fractions takes place. In addition, some degree of separation is achieved between the glucose and fructose within the monosaccharide eluting portion of the cycle. Where a syrup enriched to the extent that it contains 60% fructose on the dry solids basis is desired, a recovery of a suitable fraction having this characteristic may be readily achieved. On the other hand where it is desired that a substantially pure fructose preparation is recovered it is more economical to utilize the calcium salt of the resin, although in the latter instant the separation procedures require a substantially longer period of time.

The process of the invention is particularly useful for treating starch conversion syrups and the invention will be described hereinafter with reference thereto, although it must be recognized that the process of our invention is applicable to a wide variety of other aqueous solutions containing monosaccharides and the di- and higher saccharides.

The starch conversion syrups which are treated according to the present invention are preferably first neutralized and filtered to remove fatty acids, protein and other impurities. Syrups consisting predominately of glucose may be treated according to this invention to sepaarte therefrom the di- and higher saccharides. Enzymatic treatments to increase the level of fructose are well known in the art; a typical process is disclosed in the aforementioned Scallet et al. patent. The present invention may be used with syrups having at least 15% fructose. A preferred syrup for use as a starting material is sold under the trade name Isomerose by Standard Brands Incorporated. An analysis of Isomerose reveals that it contains 71.5% solids, has a pH of 4.6, and an ash content of 0.06. The dry solids comprise 52% glucose, 40.7% fructose, 0.6% other monosaccharides, 6.4% disaccharides and 0.4% trisaccharides and higher sugars.

The separation process used in accordance with the present invention is based upon the use of columns of polystyrene sulfonate cation exchange resins, preferably those prepared by cross-linking with from about 2 to about 8 weight percent of di-vinyl benzene. A similar separation process, applied to the problem of separating glucose and fructose is disclosed in the co-pending application of Asko J. Melaja, Ser. No. 59,987, filed July 31, 1970, now U.S. Pat. No. 3,692,582.

The process of the present invention departs from prior art techniques in that it uses a column of resin having a height of from about 2.5 to about 5 meters. This is compared with normal resin bed depths of from .6 to 1.8 meters. It was unexpected that the process of this invention provided the excellent separation results achieved.

It is also important to the success of the present process that the feed sugar solution be supplied to the top of the resin column in uniform supply. Disturbances caused by non-uniformity of supply of the solution to the resin bed causes the separation procedures to be less exact, and the fractions to overlap one upon the other. Each successive supply of liquid to the top of the column must be supplied, in so far as possible, across a horizontal plane, with a minimum of mixing taking place at the interface.

The considerations with regard to temperature at which the process is carried out are similar to those found with other ion exclusion processes known to the art. Higher temperatures are required where more viscous solutions are used. It is preferred that the process of this invention operate within the range of 20 to 80° C.

The aqueous feed solution used in the process of the present invention preferably contains a dry material content of from 20 to 60% by weight. This may vary, depending upon the viscosity of the solution and the temperature employed in the process. A flow rate of material through the column ranging from 0.2 to 4.0 cubic meters per hour per square meter of the cross-section of the resin column may be employed.

EXAMPLE I

The present invention may be further described with reference to the attached Drawing, which shows a curve obtained by following the concentration of mono-, di-, and tri-saccharides in the eluate of a column of resin in accordance with the process of the present invention.

The process illustrated by the drawing was a separation of Isomerose identified above. The height of resin in the column was 3.5 meters and the volume of resin used was 130 liters. The resin employed was a polystyrene sulfonate cation exchange resin crosslinked with 3.5% by weight di-vinyl benzene; the sodium form was used.

The total feed to the column was 5 kilograms of dry substance and the concentration of dry substance in the solution was 37%. The flow rate was 40 liters per hour. The temperature of the column was about 60° C. The resin had a mean particle size of 0.30 mm. and the resin particle size was uniform.

The curves of the drawing show that the trisacchardies leave the column first and are substantially removed after approximately 30 minutes. The disaccharides then begin to leave the column and after 60 minutes their removal is substantially completed, accompanied by a small amount of monosaccharide. The balance of the cycle removes the major portion of the monosaccharides.

In accordance with one embodiment of the invention, the portion of the eluated solids described as product fraction may be further subdivided into 3 fractions. The first, measured on the "min" scale from 6 to about 8, is a glucose-rich fraction, and may be separately recovered. A second fraction, collected from about 8 to about 9 on the "min" scale, is an intermediate fraction, containing about equal parts of fructose and glucose, and this fraction may, if desired, be returned to the system in making up new feed solution. A third fraction, the balance of the elulate, is a fructose-rich fraction, and may be collected for subsequent use.

The following chart gives the distribution coefficient of each of the components of the mixture. The distribution coefficient expresses the potential for separation for each component and is defined as K=amount of solute in stationary phase divided by amount of solute in mobile phase. The distribution coefficient $K_D$ is calculated as $K_D = V_E(1-V_0)/A_L$ where $V_E$= effluent volume of solute chromatograph peak, $V_0$= partial void-volume, A=area of column and L=height of column.

|  | $K_d(Na+)$ | $K_d(Ca++)$ |
|---|---|---|
| Trisaccharide | 0.31 | 0.31 |
| Disaccharide | 0.41 | 0.41 |
| Monosaccharide | 0.53 | 0.50 |
| Glucose | 0.50-0.52 | 0.47 |
| Fructose | 0.54-0.57 | 0.56 |

Depending upon where the fraction is taken on the curve shown in the drawing, the yield of monosaccharide end product can approach 100%. The following table shows the relationship of the monosaccharide content of the product with the total yield of dry substance and the yield of monosaccharides.

| Percent of monosaccharide in product | Yield percent of dry substance in product from total feed | Yield of monosaccharide, percent |
|---|---|---|
| 100 | 92.5 | 96.3 |
| 99.6 | 95.6 | 99.6 |
| 98.8 | 96.8 | 99.9 |

The resin used in the columns must be of a uniform particle size and should have a mean particle size within the range of about 20 to about 100 U.S. mesh; a preferred range of mean particle size is 0.2 to 0.6 mm.

We claim:
1. A method for separating monosaccharides from a starch conversion syrup which comprises
   (a) providing a column of a salt of a polystyrene sulfonate cation exchange resin cross-coupled with from about 2 to about 8 weight percent of di-vinyl benzene, the column having a height of from about 2.5 to about 5 meters, the resin being of uniform particle size and having a mean particle size within the range of about 20 to 100 U.S. mesh.
   (b) submerging the column of resin in water,
   (c) introducing an aqueous feed solution comprising a starch conversion syrup, having a dry material content of 20 to 60% by weight in uniform supply to the resin surface in the column at a flow rate of 0.2 to 4.0 cubic meters per hour per square meter of the cross-section of the resin column, and
   (d) recovering successively from the downstream side of the resin bed
      (1) a first fraction containing di-, tri-, and oligosaccharides, together with a small amount of monosaccharides, and
      (2) a second fraction of substantially pure monosaccharide content.

2. The method of claim 1, wherein the salt of the exchange resin in (a) is selected from the group consisting of alkali metal and alkaline earth metal salts.

3. The method of claim 2, wherein the salt is a sodium salt.

4. The method of claim 2, wherein the salt is a calcium salt.

5. The process of claim 1, wherein the aqueous feed solution of (c) is followed by a quantity of water to the column and the quantity of water is followed by a new batch of aqueous feed solution (c), the quantities of the respective batches of aqueous feed solution and water being calculated to provide successive cycles of fractions from the column comprising a first fraction containing substantially all of the di-, tri-, and oligosaccharide content of the sugar solution, and a second fraction of substantially pure monosaccharide.

6. The process of claim 5, wherein the salt of the exchange resin in (a) therein is a sodium salt.

7. The process of claim 5, wherein the aqueous feed solution of (c) is a starch conversion syrup, refined to be essentially free of organic acids and ash, and containing at least 15% fructose and substantial quantities of di-, tri-, and oligosaccharides.

8. The process of claim 7, wherein the second fraction comprising a substantially pure mixture of fructose and glucose is further separated into fructose and glucose by
   (a) providing a column of alkali earth metal salt of a polystyrene sulfonate cation exchange resin cross-coupled with about 2 to 8 weight percent of di-vinyl benzene, the column having a height of from about 2.5 to about 5 meters,
   (b) submerging the column of resin in water,
   (c) introducing said second fraction comprising an aqueous feed solution of fructose and glucose having a dry material content of 25 to 55% by weight in uniform supply to the resin surface in the column at a flow rate of 0.2 to 1.5 cubic meters per hour per square meter of the cross-section of the resin column, (d) recovering successively from the downstream side of the resin bed (1) a glucose fraction, (2) a fraction containing glucose and fructose, and (3) a fructose fraction, the fraction (2) being not higher than 35% dry material by weight as calculated from the invert sugar supply, and (e) returning the fraction (2) containing fructose and glucose as a diluent to provide, with new feed stock, the aqueous feed solution (c) above.

9. A method for separating monosaccharides from a starch conversion syrup which comprises (a) providing a column of a salt of a polystyrene sulfonate cation exchange resin cross-coupled with from about 2 to about 8 weight percent of di-vinyl benzene, the column having a height of from about 2.5 to about 5 meters, the resin being of uniform particle size and having a mean particle size within the range of about 20 to 100 U.S. mesh, (b) submerging the column of resin in water, (c) introducing an aqueous feed solution comprising a starch conversion syrup, having a dry material content of 20 to 60% by weight in uniform supply to the resin surface in the column at a flow rate of 0.2 to 4.0 cubic meters per hour per square meter of the cross-section of the resin column, (d) recovering successively from the downstream side of the resin bed,
   (1) a first fraction containing di-, tri-, and oligosaccharides, together with a small amount of monosaccharides,
   (2) a second fraction, rich in glucose,
   (3) a third, intermediate fraction containing glucose and fructose, and
   (4) a fructose-rich fraction, and (e) recirculating the fraction (3) by adding it to new feed stock to provide the aqueous feed solution of step (c) above.

10. The method of claim 9, wherein the salt of the exchange resin in (a) is selected from the group consisting of alkali metal and alkaline earth metal salts.

11. The method of claim 10, wherein the salt is a sodium salt.

12. The method of claim 10, wherein the salt is a calcium salt.

13. The process of claim 9 wherein the aqueous feed solution of (c) is followed by a quantity of water to the column and the quantity of water is followed by a new batch of aqueous feed solution (c), the quantities of the respective batches of aqueous feed solution and water being calculated to provide successive cycles of fractions from the column comprising a first fraction containing substantially all of the di-, tri-, and oligosaccharide content of the sugar solution, a second fraction, rich in glucose, a third fraction comprising approximately equal parts of fructose and glucose, and a fourth fraction, rich in fructose.

14. The process of claim 13, wherein the salt of the exchange resin in (a) therein is a calcium salt.

15. The process of claim 13, wherein the aqueous feed solution of (c) is a starch conversion syrup, refined to be essentially free of organic acids and ash, and containing at least 15% fructose and substantial quantities of di-, tri-, and oligosaccharides.

References Cited
UNITED STATES PATENTS

| | | | |
|---|---|---|---|
| 3,692,582 | 9/1972 | Melaja | 127—46 A |
| 3,174,876 | 3/1965 | Stark | 127—46 R |
| 3,044,906 | 7/1962 | Lefevre | 127—46 R |
| 3,044,905 | 7/1962 | Lefevre | 127—46 R |
| 3,483,031 | 12/1969 | Lauer et al. | 127—46 R |
| 3,416,961 | 12/1968 | Mountfort et al. | 127—46 A |
| 3,471,329 | 10/1969 | Quietensky et al. | 127—46 A |
| 2,818,851 | 1/1958 | Khym et al. | 127—46 A |

MORRIS O. WOLK, Primary Examiner

S. MARANTZ, Assistant Examiner

U.S. Cl. X.R.

127—38, 46 A